(12) United States Patent
Luo et al.

(10) Patent No.: US 11,228,387 B2
(45) Date of Patent: *Jan. 18, 2022

(54) TIME SYNCHRONIZATION METHOD AND DEVICE

(71) Applicant: Huawei Technologies Co., Ltd., Shenzhen (CN)

(72) Inventors: Junfeng Luo, Shenzhen (CN); Jinhui Wang, Dongguan (CN); Zhu Cheng, Wuhan (CN); Feng Wu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/008,924

(22) Filed: Sep. 1, 2020

(65) Prior Publication Data

US 2020/0403720 A1 Dec. 24, 2020

Related U.S. Application Data

(63) Continuation of application No. 16/259,142, filed on Jan. 28, 2019, now Pat. No. 10,855,387, which is a
(Continued)

(51) Int. Cl.
*H04J 3/06* (2006.01)
*G06F 1/14* (2006.01)
*H04L 29/06* (2006.01)

(52) U.S. Cl.
CPC .............. *H04J 3/0667* (2013.01); *G06F 1/14* (2013.01); *H04J 3/0638* (2013.01); *H04J 3/0644* (2013.01); *H04L 69/28* (2013.01)

(58) Field of Classification Search
CPC ........ H04L 69/22; H04L 69/28; H04W 28/06; H04J 3/0667; H04J 3/0638; H04J 3/0644; G06F 1/14
See application file for complete search history.

(56) References Cited

U.S. PATENT DOCUMENTS 8,775,849 B2 7/2014 Sorbara et al.
10,855,387 B2 * 12/2020 Luo ............ H04J 3/0638
(Continued)

FOREIGN PATENT DOCUMENTS

CN 101222281 A 7/2008
CN 101873187 A 10/2010
(Continued)

OTHER PUBLICATIONS

"Technical requirements for high accuracy time synchronization," YD/T2375-2011, Dec. 20, 2011, 36 pages.
(Continued)

*Primary Examiner* — Sung S Ahn
(74) *Attorney, Agent, or Firm* — Conley Rose, P.C.

(57) ABSTRACT

A time synchronization method and a device, where the method includes generating, by a first device, a first time synchronization frame according to a first coding scheme, where the first time synchronization frame includes a first frame header and a first time of day (TOD), the first frame header carries an identifier of the first coding scheme, and the first coding scheme defines a boundary of the first time synchronization frame and a location of the first TOD in the first time synchronization frame, and sending, by the first device, the first time synchronization frame to a second device using a first single line to trigger the second device to identify the first time synchronization frame according to the identifier of the first coding scheme, to obtain the first TOD from the first time synchronization frame, and to trace a time of the first device according to the first TOD.

31 Claims, 9 Drawing Sheets

Related U.S. Application Data continuation of application No. PCT/CN2016/094456, filed on Aug. 10, 2016.

(56) References Cited

U.S. PATENT DOCUMENTS

| | | |
|---|---|---|
| 2006/0280226 A1 | 12/2006 | Krasner |
| 2012/0020417 A1* | 1/2012 | Wei .................. H04L 27/2656 375/259 |
| 2012/0079310 A1* | 3/2012 | Matsusue .............. G06F 1/14 713/400 |

FOREIGN PATENT DOCUMENTS

| | | |
|---|---|---|
| CN | 102355281 A | 2/2012 |
| CN | 103346873 A | 10/2013 |
| CN | 103401672 A | 11/2013 |
| CN | 104601268 A | 5/2015 |
| JP | 2014135657 A | 7/2014 |

OTHER PUBLICATIONS

Partial English Translation of "Technical requirements for high accuracy time synchronization," YD/T2375-2011, Dec. 20, 2011, 5 pages.

"IEEE Standard for a Precision Clock Synchronization Protocol for Networked Measurement and Control Systems," IEEE Std 1588, Jul. 24, 2008, 289 pages.

Ikanos Communications, "G.vdsl: Frequency Synchronization of Time Stamping Clocks in VDSL2 ToD transport.; TD11KH-035," XP044109250, ITU-T Draft; Study Period 2009-2012, vol. 4/15, Jan. 17-20, 2011, pp. 1-8.

\* cited by examiner

TIME SYNCHRONIZATION METHOD AND DEVICE

CROSS-REFERENCE TO RELATED APPLICATIONS

This application is a continuation of U.S. patent application Ser. No. 16/259,142 filed on Jan. 28, 2019, which is a continuation of International Patent Application No. PCT/CN2016/094456 filed on Aug. 10, 2016. Both of the aforementioned applications are hereby incorporated by reference in their entireties.

TECHNICAL FIELD

This application relates to the communications field, and in particular, to a time synchronization method and a device.

BACKGROUND

In a time synchronization solution, time synchronization may be required between different types of devices or devices of different manufacturers. For example, time synchronization is required between a Global Positioning System (GPS) receiver and a building integrated timing supply (BITS) device, time synchronization is required between a BITS and a transport bearer device, time synchronization is required between transport bearer devices, time synchronization is required between a transport bearer device and a base station device, and time synchronization is required between a satellite positioning system receiver and a base station device. The foregoing scenarios may be related to interworking between time interfaces. The time interface is used to transmit a one pulse per second (1PPS) and a time of day (TOD).

However, in a current solution, the TOD is transmitted depending on a technical solution defined in the China Communications Standards Association (CCSA). Further, one line needs to be occupied when the TOD is transmitted, and another line needs to be occupied when a 1PPS signal (that is, a frame header) is transmitted. More line resources are occupied in the other approaches, and consequently line resources are wasted.

SUMMARY

Embodiments of this application provide a time synchronization method and a device such that a TOD and a frame header can be transmitted using a single line in order to save line resources.

According to a first aspect, a time synchronization method is provided, including generating, by a first device, a first time synchronization frame according to a first coding scheme, where the first time synchronization frame includes a first frame header and a first TOD, the first frame header carries an identifier of the first coding scheme, and the first coding scheme defines a boundary of the first time synchronization frame and a location of the first TOD in the first time synchronization frame, and sending, by the first device, the first time synchronization frame to a second device using a first single line in order to trigger the second device to identify the first time synchronization frame according to the identifier of the first coding scheme, obtain the first TOD from the first time synchronization frame, and trace a time of the first device according to the first TOD.

The first device generates, according to the first coding scheme, the first time synchronization frame including the first TOD and the first frame header, where the first frame header carries the identifier of the first coding scheme, and the first coding scheme defines the boundary of the first time synchronization frame and the location of the first TOD in the first time synchronization frame, and sends the first time synchronization frame to the second device using a single line such that the second device identifies the first time synchronization frame according to the identifier of the first coding scheme, obtains the first TOD from the first time synchronization frame, and traces the time of the first device according to the first TOD in order to save line resources.

In some possible implementations, the method further includes receiving, by the first device, a second time synchronization frame from a third device using a second single line, where the second time synchronization frame is generated by the third device according to a second coding scheme, the second time synchronization frame includes a second TOD and a second frame header, the second frame header carries an identifier of the second coding scheme, and the second coding scheme defines a boundary of the second time synchronization frame and a location of the second TOD in the second time synchronization frame, identifying, by the first device, the second time synchronization frame according to the identifier of the second coding scheme, and obtaining the second TOD from the second time synchronization frame, and tracing, by the first device, a time of the third device according to the second TOD.

The first device keeps time synchronization with the third device, and a specific process is the same as the process in which the second device keeps time synchronization with the first device. That is, the first device may receive and send time information simultaneously such that tracing and protection of multiple devices may be implemented.

In some possible implementations, the method further includes receiving, by the first device, a second time synchronization frame from a third device using a second single line, where the second time synchronization frame is generated by the third device according to a second coding scheme, the second time synchronization frame includes a second TOD and a second frame header, the second frame header carries an identifier of the second coding scheme, and the second coding scheme defines a boundary of the second time synchronization frame and a location of the second TOD in the second time synchronization frame, identifying, by the first device, the second time synchronization frame according to the identifier of the second coding scheme, and obtaining the second TOD from the second time synchronization frame, determining, by the first device, a delay for transmitting the second time synchronization frame from the first device to the third device, correcting, by the first device, the second TOD according to the delay, and tracing, by the first device, a time of the third device according to the corrected second TOD.

The first device corrects the TOD according to the delay between the first device and the third device such that a time of the first device may be precisely consistent with that of the third device by means of time correction, that is, the first device keeps time synchronization with the third device.

In some possible implementations, that the first device determines a delay for transmitting the second time synchronization frame from the first device to the third device includes sending, by the first device at a first time, the second time synchronization frame to the third device using the second single line, receiving, by the first device at a second time, the second time synchronization frame returned by the third device, and determining, by the first device, that the delay for transmitting the second time synchronization frame from the first device to the third device is equal to half of a difference between the second time and the first time.

In this embodiment of this application, after receiving the first time synchronization frame, the first device may perform automatic delay measurement. With the automatic delay measurement of the first device, manual delay measurement is avoided such that engineering deployment is reduced.

In some possible implementations, the first time synchronization frame further carries a first time source identifier.

In this embodiment of this application, the first time synchronization frame may carry the first time source identifier of the first device, for example, identity (ID) information. The first time synchronization frame may further include priority information of the first device, or may further include other information and the like. This is not limited in this application. In this embodiment of this application, a time source identifier is carried in a time synchronization frame. In large-scale networking, a time source may still be accurately obtained. This reduces costs for repairing a line, and improves reliability.

In some possible implementations, the first time synchronization frame further carries first frequency information, and the first time synchronization frame is further used to trigger the second device to trace the time of the first device according to the first frequency information.

The first time synchronization frame may further carry the first frequency information. For example, one bit is transmitted every 31.25 microseconds (μs), that is, a frequency is 32 kilohertz (KHz). In this way, the first device does not need to add extra deployment of a 2 megabits per second (Mbps) external clock interface or a line. This reduces engineering deployment, and reduces a waste of line resources.

In some possible implementations, the second device and the third device are a same device. That is, bidirectional transmission of time information between two devices may be implemented.

In some possible implementations, the second time synchronization frame further carries a second time source identifier.

The second time source identifier and the first time source identifier may be the same, or may be different. This is not limited in this application.

In some possible implementations, the second time synchronization frame further carries second frequency information, and that the first device traces a time of the third device according to the corrected second TOD includes tracing, by the first device, the time of the third device according to the corrected second TOD and the second frequency information.

When the first device needs to trace the time of the third device, times of the two devices need to be consistent at any time. The second time synchronization frame may further carry second frequency information such that the first device traces the time of the third device according to the frequency information and the corrected time information. In this way, the first device does not need to add extra deployment of a 2 Mbps external clock interface or a line. This reduces engineering deployment, and reduces a waste of line resources.

According to a second aspect, a first device is provided, and the first device includes all units that are used to execute the method according to the first aspect or any one of possible implementations of the first aspect.

According to a third aspect, a first device is provided, including a processor and a memory.

The memory stores a program, and the processor executes the program in order to execute the time synchronization method according to the first aspect or any one of the possible implementations of the first aspect.

According to a fourth aspect, a computer storage medium is provided. The computer storage medium stores program code, and the program code is used to indicate an instruction that is used to execute the time synchronization method according to the first aspect or any one of the possible implementations of the first aspect.

Based on the foregoing technical solutions, in the embodiments of this application, a first device generates, according to a first coding scheme, a first time synchronization frame including a first TOD and a first frame header, where the first frame header carries an identifier of the first coding scheme, and the first coding scheme defines a boundary of the first time synchronization frame and a location of the first TOD in the first time synchronization frame, and sends the first time synchronization frame to a second device using a single line such that the second device identifies the first time synchronization frame according to the identifier of the first coding scheme, obtains the first TOD from the first time synchronization frame, and traces a time of the first device according to the first TOD in order to save line resources.

BRIEF DESCRIPTION OF DRAWINGS

To describe the technical solutions in some of the embodiments of this application more clearly, the following briefly describes the accompanying drawings describing some of the embodiments. The accompanying drawings in the following description merely show some embodiments of this application, and persons of ordinary skill in the art can derive other drawings from these accompanying drawings without creative efforts.

DESCRIPTION OF EMBODIMENTS

The following clearly describes the technical solutions in the embodiments of this application with reference to the accompanying drawings in the embodiments of this application. The described embodiments are some rather than all of the embodiments of this application. All other embodiments can be obtained by persons of ordinary skill in the art based on the embodiments of this application without creative efforts.

An RS422 level uses a differential transmission manner, and generally has two pins A and B. When a voltage difference between a transmit end A and a transmit end B is +2 to +6, it indicates "1", and when the voltage difference between the transmit end A and the transmit end B is −2 to −6, it indicates "0". When a voltage difference between a receive end A and a receive end B is greater than +200 millivolts (mv), it indicates "1", and when the voltage difference between the receive end A and the received end B is less than −200 my, it indicates "0". A logical "1" is defined as a state B>A, and a logical "0" is defined as a state A>B. A voltage difference between A and B is not less than 200 my. When a one-to-one connector is used, the RS422 level supports only unidirectional transmission and half-duplex communication, and a maximum transmission rate is 10 Mbps.

Differential transmission is a signal transmission technology. Different from use of a signal cable and a ground cable in a conventional technology, in the differential transmission, signals are transmitted over the two cables. Amplitudes of the two signals are the same, but phases of the two signals are opposite. A signal transmitted over the two cables is a differential signal. For the differential signal, a value is used to represent a difference between two physical quantities. The differential signal is also referred to as a differential mode signal, which is relative to a common mode signal.

Figure 1:
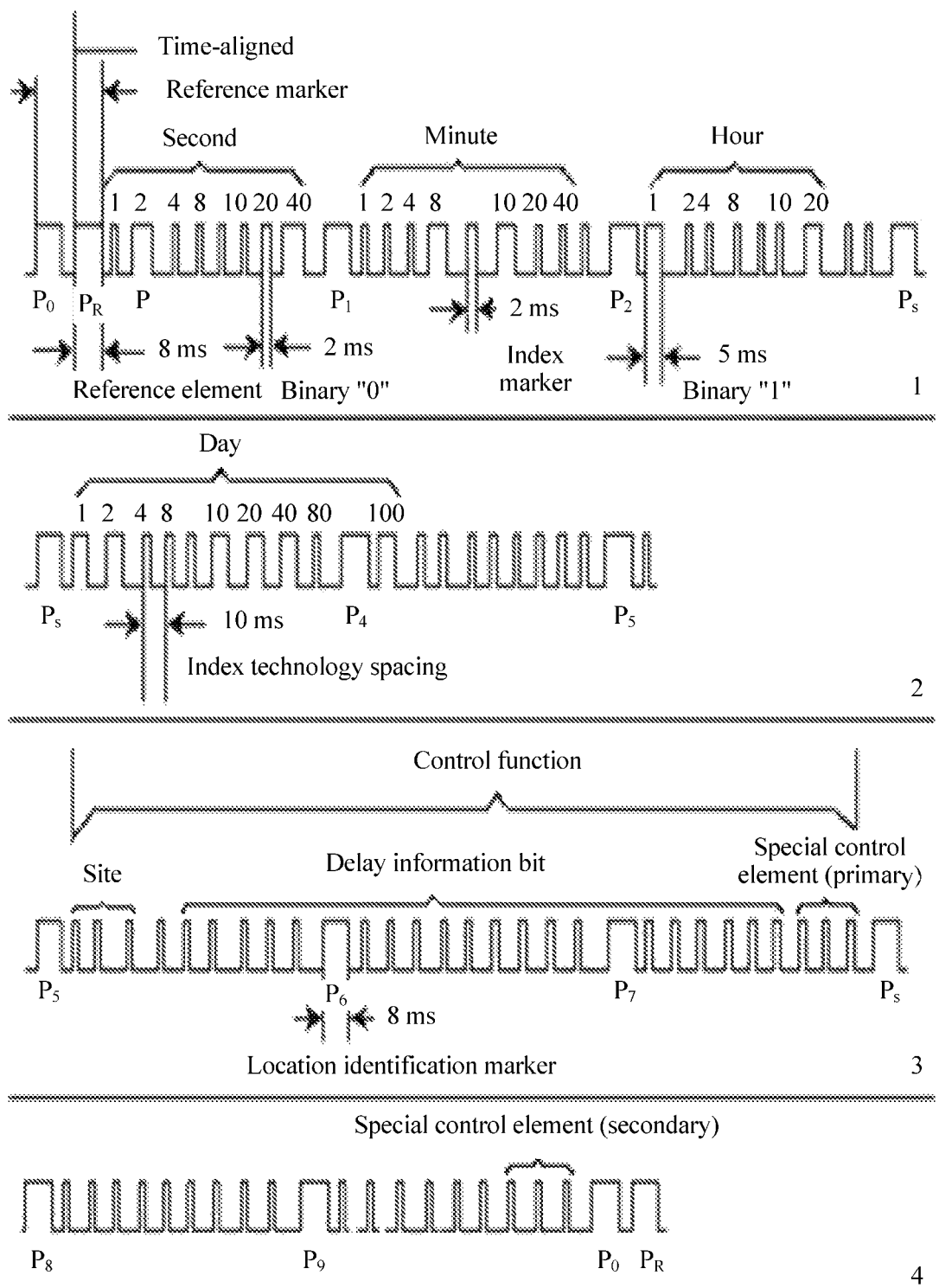
FIG. 1 is a schematic diagram of a coding scheme of the direct current (DC) Level Shift (DCLS) protocol.

The DCLS includes day, hour, minute, second, and control information. As shown in FIG. 1, two consecutive broad pulses of 8 milliseconds (ms) indicate a start of second. If elements are encoded at the second 8 ms, the elements are respectively element 0, element 1, element 2, . . . , and element 99. A time format includes day, hour, minute, and second, and a time sequence is second-minute-hour-day. Occupied information bits are as follows. The second occupies 7 bits, the minute occupies 7 bits, the hour occupies 6 bits, and the day occupies 10 bits. Locations of the day, hour, minute, and second are between P0 to P5. P6 to P0 include other control information. Information about "second" includes element 1, element 2, element 3, element 4, element 6, element 7, and element 8, information about "minute" includes element 10, element 11, element 12, element 13, element 15, element 16, and element 17, and information about "hour" includes element 20, element 21, element 22, element 23, element 25, and element 26. Element 5, element 14, and element 24 are index markers with a width of 2 ms. All the hour, minute, and second are represented using a Binary Coded Decimal (BCD) code (that is, a binary code of ten values from "0" to "9"). A low bit precedes a high bit, and a tens place follows a ones place.

Figures 2A, 2B, 2C:
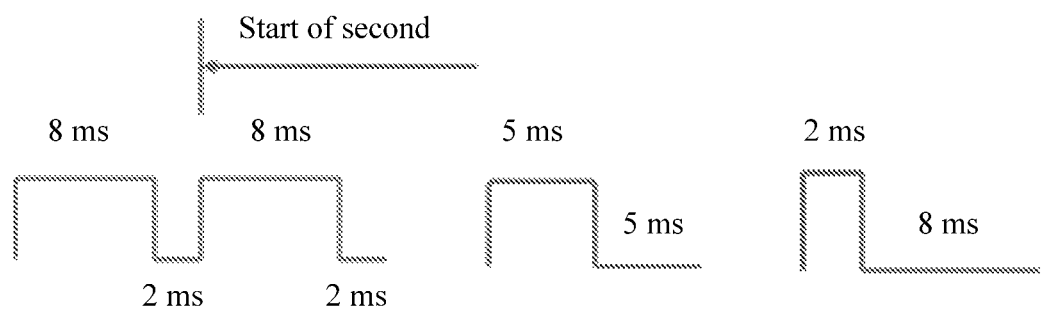
FIG. 2A, FIG. 2B, and FIG. 2C are schematic diagrams of a coding scheme of the DCLS protocol.

In a specific physical coding scheme, 1 second (s) is equally divided into 100 timeslots. Each timeslot includes 10 ms. A timeslot in which a high level lasts for 8 ms and a low level lasts for 2 ms identifies synchronization (as shown in FIG. 2A), two consecutive synchronization signals identify a start of second, a timeslot in which a high level lasts for 5 ms and a low level lasts for 5 ms identifies a logical "1" (as shown in FIG. 2B), and a timeslot in which a high level lasts for 2 ms and a low level lasts for 8 ms identifies a logical "0" (as shown in FIG. 2C).

Figure 3:
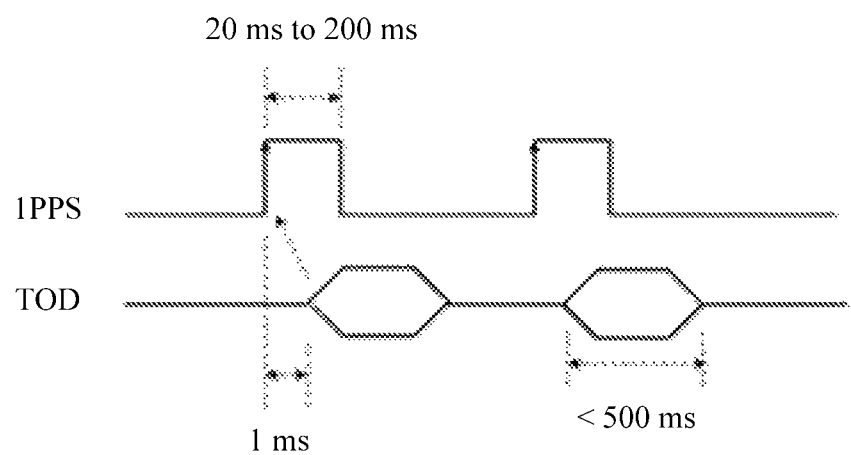
FIG. 3 is a schematic diagram of a TOD transmission method.

FIG. 3 shows a schematic diagram of a TOD transmission method. As defined by the CCSA, for TOD transmission, a baud rate is 9600 by default, no parity check is performed, one start bit (which is indicated using a low level) and one stop bit (which is indicated using a high level) are used, an idle frame is indicated using a high level, there are eight data bits, and transmission of the TOD should start after a 1PPS rises by 1 ms and should be completed within 500 ms. The TOD indicates a time at which the current 1PPS triggers a rising edge. In addition, a sending frequency of a TOD protocol packet is once per second.

Further, the 1PPS and the TOD are transmitted in an RS422 level manner. A used physical connector is an RJ45 connector or a DB9 connector, and electrical characteristics of the physical connector meet a corresponding standard requirement. A line order requirement is shown in Table 1.

TABLE 1

| PIN | Signal definition | Description |
| --- | --- | --- |
| 1 | NC | A default state is non-connected (high impedance). |
| 2 | NC | A default state is non-connected (high impedance). |
| 3 | 422_1_N | 1PPS |
| 4 | GND | RS422 level GND |
| 5 | GND | RS422 level GND |
| 6 | 422_1_P | 1PPS |
| 7 | 422_2_N | TOD time information |
| 8 | 422_2_P | TOD time information |

Figure 4:
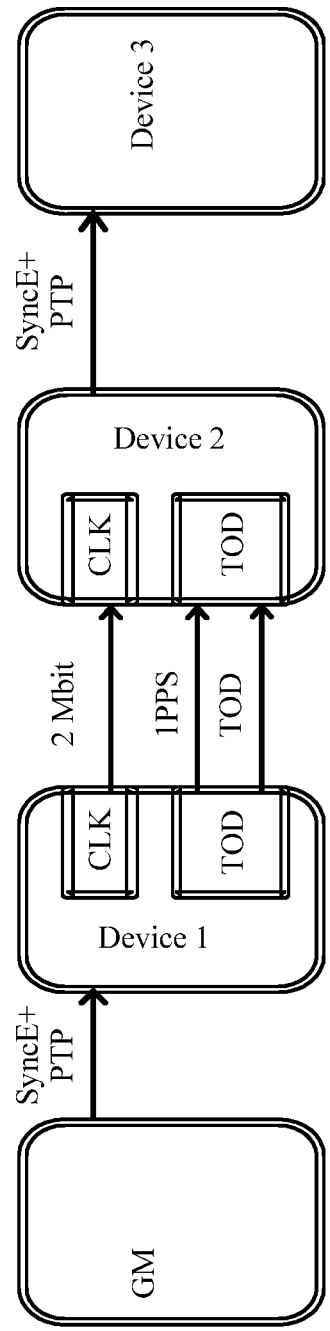
FIG. 4 is a schematic diagram of a TOD transmission scheme.

FIG. 4 shows a schematic diagram of a TOD transmission scheme. As shown in FIG. 4, a grandmaster (GM) clock and a device 1 implement time synchronization using the Synchronous Ethernet (SyncE) and the Precision Time Protocol (PTP), that is, by carrying a TOD using a frame spacing of an Ethernet frame. The frame spacing may be included in an Ethernet data stream. The Ethernet data stream may be a Gigabit Ethernet (GE) data stream. That is, a first device may perform time synchronization using a service interface, and the service interface supports a time synchronization function defined in the Institute of Electrical and Electronics Engineers (IEEE) 1588-2008 formulated by the IEEE. An extra service interface needs to be occupied when the service interface supports the time synchronization function in the IEEE 1588-2008. Alternatively, a dedicated 10 gigabit Small Form-factor Pluggable (XFP)/Small Form-factor Pluggable (SFP) module interface needs to be developed such that the service interface supports the time synchronization in the IEEE 1588-2008, and costs are relatively high.

Alternatively, for TOD transmission between a device 1 and a device 2, the device 1 and the device 2 implement time synchronization using eight lines in Table 1. Two lines are connected to ground (GND), default states of two lines are non-connected (NC), and four lines in two groups are used to send the TOD using a 1PPS and a TOD. Sending of a TOD signal and sending of a 1PPS signal are separately implemented by means of differential transmission, that is, the TOD signal and the 1PPS signal each occupy two lines. Therefore, transmission of the TOD signal and the 1PPS signal occupies all of the four lines such that the TOD can be transmitted only unidirectionally, that is, each device may only receive the TOD or send the TOD at a time. In addition, a dedicated 2 Mbps external clock (CLK) interface is required between the device 1 and the device 2 to transmit clock frequency information, and the clock frequency information is used for frequency synchronization between network elements.

Therefore, in the other approaches, sending of the TOD depends on the 1PPS sent over another line, that is, a start time for transmitting the TOD needs to be determined according to a rising edge of the 1PPS. The other approaches has the following disadvantages, line resources are wasted relatively severely, and the TOD can be transmitted only unidirectionally.

Figure 5:
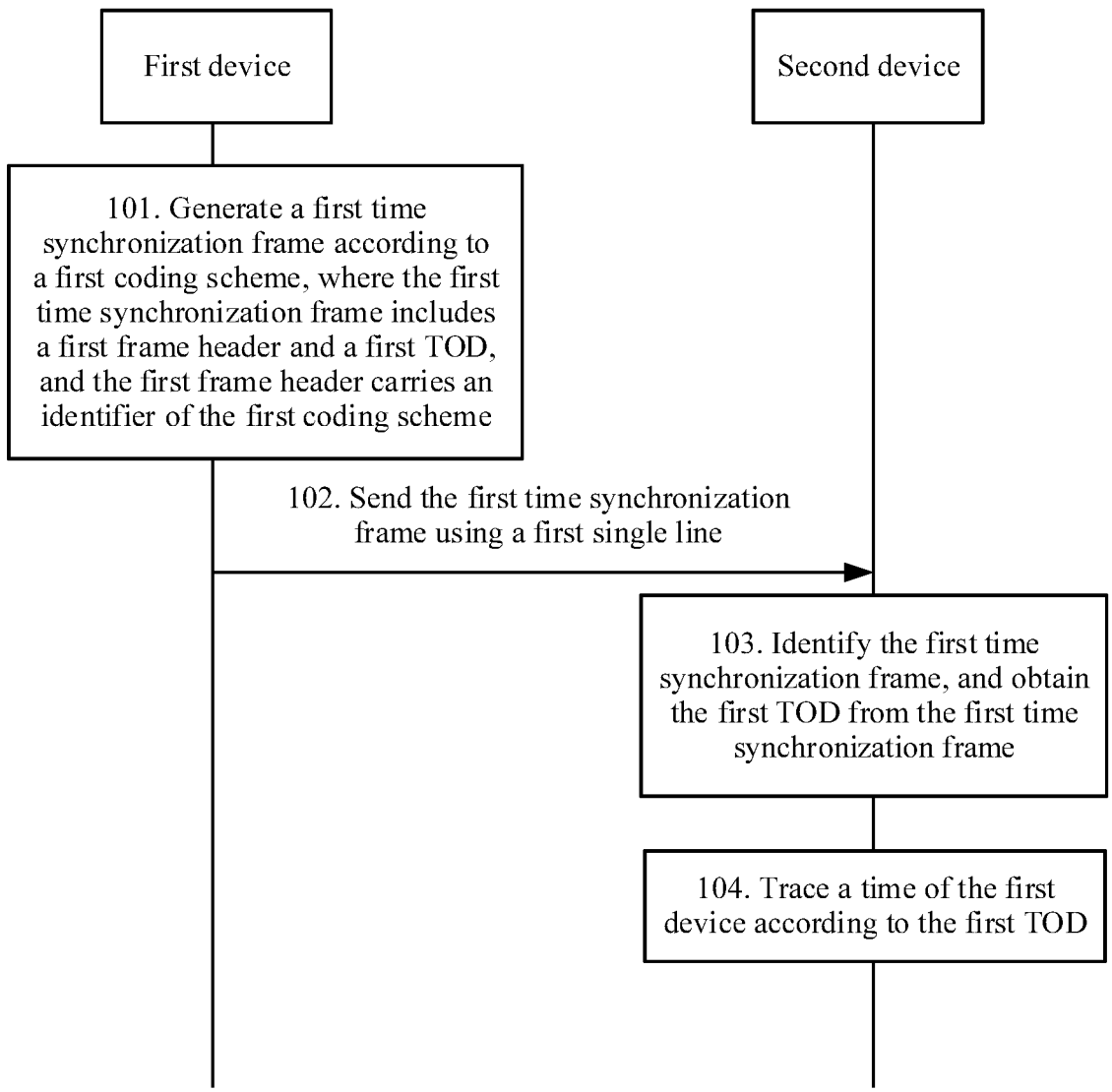
FIG. 5 is a flowchart of interaction in a time synchronization method according to an embodiment of this application.

FIG. 5 shows a flowchart of interaction in a time synchronization method according to an embodiment of this application.

Step 101. A first device generates a first time synchronization frame according to a first coding scheme, where the first time synchronization frame includes a first frame header and a first TOD, the first frame header carries an identifier of the first coding scheme, and the first coding scheme defines a boundary of the first time synchronization frame and a location of the first TOD in the first time synchronization frame.

The first device may obtain time information from a GM clock according to a frame spacing of an Ethernet frame, or the first device is the GM clock (for example, a BITS) and is configured to provide a timing service for another device such that the first device may determine a current TOD. The first device generates the first time synchronization frame according to the first coding scheme, where the first time synchronization frame carries first frame header information and the first TOD, the first frame header information carries an identifier of the first coding scheme, and the first coding scheme defines a boundary of the first time synchronization frame and the location of the first TOD in the first time synchronization frame. Further, some commonly used software programs are further required to generate the first time synchronization frame. This is not limited in this application.

The identifier of the first coding scheme may indicate an internal structure of the first time synchronization frame, a length of an occupied field, a specific frame header location and frame trailer location (represented as the boundary of the first time synchronization frame), content corresponding to different fields (that is, a field that is in the first time synchronization frame and that indicates the first TOD may be learned), and the like.

Figure 6:
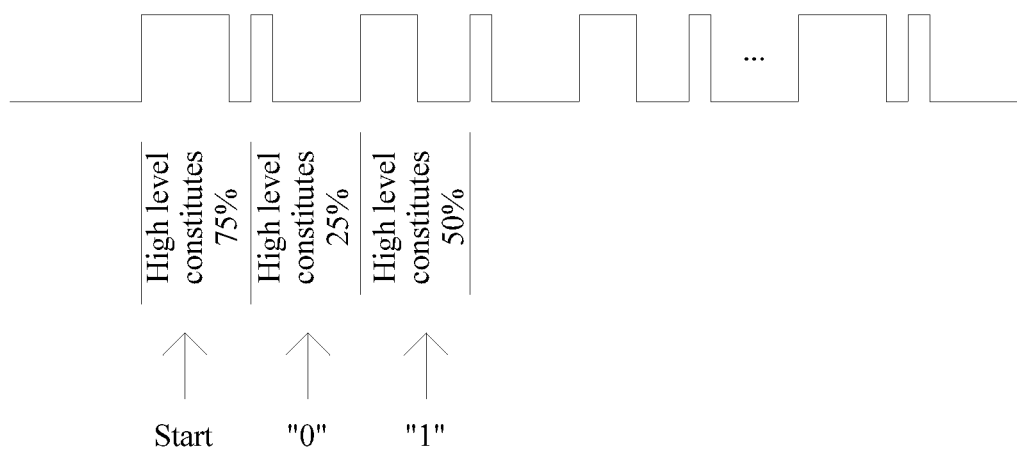
FIG. 6 is a schematic diagram of a time synchronization method according to an embodiment of this application.

Optionally, the first coding scheme defines that the first time synchronization frame includes 100 timeslots, one bit is transmitted every 31.25 μs, and 10 bits may be transmitted in a time length of one timeslot, that is, one timeslot is 312.5 μs, and when a duty cycle of a high level is 75%, it indicates a start time for sending a time synchronization frame (as shown in FIG. 6), and the like. That is, a second device may identify the first time synchronization frame according to the identifier of the first coding scheme, and may learn the location of the TOD from the first time synchronization frame, and further obtain the first TOD.

It should be understood that the first coding scheme may be determined according to the DCLS protocol. The DCLS carries element information using a direct current bit, and the DCLS is transmitted using a digital path without limitation of a transmission distance. The DCLS identifies a start of second using two consecutive synchronization signals. Each timeslot is 10 ms, and one bit is transmitted in one timeslot.

It should be further understood that this application imposes no limitation on a quantity of timeslots that form the first time synchronization frame, a quantity of bits that can be transmitted in each timeslot, content corresponding to each bit, and the like.

It should be noted that the first device may be any network device that can meet the foregoing proprietary protocol, such as a wavelength division device, a satellite positioning system receiver, a core network device, an aggregation network device, a base station, a base station controller, a server, an optical transport network device, a packet transport network device, or a switch. This is not limited in this application.

The GM clock may be any device that is used to provide a timing service, such as a satellite, a satellite positioning system receiver, a wavelength division device, a core network device, an aggregation network device, a base station, a base station controller, a server, or a switch. This is not limited in this application.

For example, the satellite positioning system receiver provides a timing service by successively using a wavelength division device, a router, a base station, and the like, or the satellite positioning system receiver provides a timing service by successively using a wavelength division device, a router, a base station, a router, a base station, and the like.

Optionally, the first time synchronization frame may convert 0, 1, 2, 3, . . . , 9 that are used to indicate year, month, day, hour, minute, and second in the time information to binary-coded signals ("0" and "1") for representation. For example, when a duty cycle of a high level is 25%, it indicates "1", and when a duty cycle of a high level is 50%, it indicates "0" (as shown in FIG. 6).

Data transmission content in each timeslot is shown in the following Table 2. An undefined idle timeslot may be made readable and writable by software such that a function may be expanded in the future.

TABLE 2

| Timeslot number | Function description | Bit width | Remarks | Filling module |
| --- | --- | --- | --- | --- |
| ts 1 | Used for sending a frame sequence number. The frame sequence number increases by 1 for each frame. The value of the frame sequence number ranges from 0 to 255. Frame sequence numbers are numbered from 0 to 255 again after 255 frames are sent. | 1 byte | Value range: 0 to 255 | Logic |
| ts 2~ts 11 | Used for sending a PTP time corresponding to a frame header. | 10 bytes | N/A | Logic |

TABLE 2-continued

| Timeslot number | Function description | Bit width | Remarks | Filling module |
|---|---|---|---|---|
| ts 12~ts 16 | Used for sending a share memory-fabric interface chip (SM-FIC) time corresponding to a frame header. | 5 bytes | N/A | Logic |
| ts 17~ts 36 | Used for sending network element declaration information. | 20 bytes | N/A | The logic automatically sends a value configured by software |
| ts 37 | Used for sending a synchronization status marker (SSM) byte. | 1 byte | N/A | The logic automatically sends a value configured by software |
| ts 38 | Used for sending a subrack number. | 1 byte | Subrack number | The logic automatically sends a value configured by software |
| ts 39 | Used for sending a cascade port number. | 1 byte | Cascade port number: TOD 0 –> 0 TOD 1 –> 70-OSC 1 –> 2 70-OSC 2 –> 3 78-OSC 1 –> 4 78-OSC 2 –> 5 | The logic automatically sends a value configured by software |
| ts 40 | Operating mode | 1 byte | Mode: 0: normal mode 1: delay measurement | The logic automatically sends a value configured by software |
| ts 41 | N/A | N/A | N/A | N/A |
| ... | ... | ... | ... | ... |
| ts 99~ts 100 | To improve reliability, a cyclic redundancy check (CRC) code is transmitted, and the CRC check can be disabled. | 2 bytes | N/A | Logic |

The PTP time occupies a bit width of 10 bytes and is used to indicate year, month, day, hour, minute, and second in the time information. The SSM byte is used to indicate a quality level of a signal in a time synchronization process.

Optionally, the first time synchronization frame further carries a first time source identifier.

Further, in the other approaches, when two devices perform time synchronization by sending the TOD, time source information is not sent. As a result, each time the TOD passes through a line interface, a time source becomes a local time source. In large-scale networking, time sources in an entire network are not clear. Consequently, when a line is faulty, costs for detecting a fault source are relatively high.

In this embodiment of this application, the first time synchronization frame may carry the first time source identifier of the first device, for example, ID information. The first time synchronization frame may further include priority information of the first device, or may further include other information. This is not limited in this application. In this embodiment of this application, a time source identifier is carried in a time synchronization frame. In large-scale networking, a time source may still be accurately obtained. This reduces costs for repairing a line, and improves reliability.

Step 102. The first device sends the first time synchronization frame to a second device using a first single line in order to trigger the second device to identify the first time synchronization frame according to the identifier of the first coding scheme, obtain the first TOD from the first time synchronization frame, and trace a time of the first device according to the first TOD.

The first device sends the first time synchronization frame to the second device using a single line. The first time synchronization frame includes the first TOD and the first frame header, or may further include a time source identifier, frequency information, and the like. This is not limited in this application. This avoids a problem in the other approaches that a separate line is required to send a 1PPS, thereby reducing a waste of line resources for sending a TOD.

The single line mentioned in this application is a line used to transmit a serial signal. For example, the single line may be implemented using a pin of an RJ45 connector. It should be understood that the RJ45 connector includes eight pins. Each of the eight pins may be used to transmit one serial signal. The eight pins as a whole transmit a parallel signal including eight serial signals. Therefore, the eight pins of the RJ45 connector may be lines used to transmit a parallel signal.

In this application, that a device A traces a time of a device B means that the device A uses the device B as a GM clock of the device A in order to calibrate a clock time in the device A.

Optionally, in an embodiment, the first time synchronization frame further carries first frequency information, and the first frequency information is further used to trigger the second device to trace the time of the first device according to the first frequency information.

Further, in an embodiment of this application, the first time synchronization frame further includes the first frequency information. The second device traces the time of the first device according to the first frequency information. For example, one bit is transmitted every 31.25 μs, that is, a frequency is 32 KHz. In this way, the first device does not need to add extra deployment of a 2 Mbps external clock interface or a line. This reduces engineering deployment, and reduces a waste of line resources. The frequency may be obtained by dividing a system clock frequency. For example, 38.88 Mbps is divided by 1215 during frequency division, that is, 38.88 Mbps=38880 K=38880000 hertz (Hz), and 38880000/1215=32000 Hz.

In addition, the first coding scheme defines that the first time synchronization frame includes 100 timeslots. 10 bits may be transmitted in a time length of one timeslot, and a frame frequency is 32000 Hz/1000=32 Hz. Compared with the other approaches in which a TOD transmission frequency is once per second, in this embodiment of this application, a TOD transmission rate can be improved.

It should be understood that, in this embodiment of this application, an interface that is used to transmit a 1PPS and a TOD in the other approaches may be referred to as an "enhanced time interface". This is not limited in this application.

Step 103. The second device identifies the first time synchronization frame, and obtains the first TOD from the first time synchronization frame.

Further, the second device receives the first time synchronization frame sent by the first device, where the first time synchronization frame includes the first frame header and the first TOD, the first frame header carries the identifier of the first coding scheme, and the first coding scheme defines the boundary of the first time synchronization frame and the location of the first TOD in the first time synchronization frame. The second device parses the time synchronization frame according to the first coding scheme. In this way, the second device can obtain the first time synchronization frame, and obtain the first TOD from the first time synchronization frame such that the second device can trace the time of the first device according to the first TOD.

Step 104. The second device traces the time of the first device according to the identified first TOD.

Optionally, the second device may keep more precise time synchronization with the first device according to the first TOD and the frequency information in the first time synchronization frame in the embodiment of this application.

It should be noted that the second device further needs to perform phase synchronization. However, this application imposes no limitation on a manner of phase synchronization.

Optionally, the method further includes receiving, by the first device, a second time synchronization frame from a third device using a second single line, where the second time synchronization frame is generated by the third device according to a second coding scheme, the second time synchronization frame includes a second TOD and a second frame header, the second frame header carries an identifier of the second coding scheme, and the second coding scheme defines a boundary of the second time synchronization frame and a location of the second TOD in the second time synchronization frame, identifying, by the first device, the second time synchronization frame according to the identifier of the second coding scheme, and obtaining the second TOD from the second time synchronization frame, and tracing, by the first device, a time of the third device according to the second TOD.

A manner of generating the second time synchronization frame is the same as that of generating the first time synchronization frame. The second time synchronization frame includes the second TOD and the second frame header, the second frame header carries the identifier of the second coding scheme, and the second coding scheme defines the boundary of the second time synchronization frame and the location of the second TOD in the second time synchronization frame. The first device keeps time synchronization with the third device, and a specific process is the same as the process in which the second device keeps time synchronization with the first device. To avoid repetition, details are not described herein again. That is, the first device may receive and send a time synchronization frame simultaneously (that is, receiving and sending the TOD simultaneously), that is, the first device may trace the time of the third device, and the second device may trace the time of the first device such that multiple devices may keep time synchronization with each other.

It should be understood that the first time synchronization frame and the second time synchronization frame may be completely the same, or partially different (for example, only coding schemes are the same, but TOD content or frame header content is different), or completely different. This is not limited in this application.

Optionally, the method further includes receiving, by the first device, a second time synchronization frame from a third device using a second single line, where the second time synchronization frame is generated by the third device according to a second coding scheme, the second time synchronization frame includes a second TOD and a second frame header, the second frame header carries an identifier of the second coding scheme, and the second coding scheme defines a boundary of the second time synchronization frame and a location of the second TOD in the second time synchronization frame, identifying, by the first device, the second time synchronization frame according to the identifier of the second coding scheme, and obtaining the second TOD from the second time synchronization frame, determining, by the first device, a delay for transmitting the second time synchronization frame from the first device to the third device, correcting, by the first device, the second TOD according to the delay, and tracing, by the first device, a time of the third device according to the corrected second TOD.

Further, in an embodiment, the first device may receive the second time synchronization frame sent, by the third device, over the second single line. A manner of generating the second time synchronization frame is the same as that of generating the first time synchronization frame. The second time synchronization frame includes the second TOD and the second frame header, the second frame header carries the identifier of the second coding scheme, and the second coding scheme defines the boundary of the second time synchronization frame and the location of the second TOD in the second time synchronization frame. The first device obtains the second TOD from the third device. The first device is not consistent with the second TOD. The first device further needs to determine the delay for transmitting the second time synchronization frame from the first device to the third device, and trace the time of the third device according to the second TOD and the delay.

It should be understood that time information of the first device may be manually measured and corrected such that the first device keeps time synchronization with the third device. This is not limited in this application.

Optionally, in an embodiment, the second time synchronization frame further carries second frequency information, and that the first device traces a time of the third device according to the corrected second TOD includes tracing, by the first device, the time of the third device according to the corrected second TOD and the second frequency information.

When a device needs to trace a time of another device, times of the two devices are required to be consistent at any time. In this embodiment of this application, the second time synchronization frame may further carry the second frequency information such that the first device traces the time of the third device according to the frequency information and the corrected time information. In this way, the first device does not need to add extra deployment of a 2 Mbps external clock interface or a line. This reduces engineering deployment, and reduces a waste of line resources.

Optionally, in this embodiment of this application, that the first device determines a delay for transmitting the second time synchronization frame from the first device to the third device includes sending, by the first device at a first time, the second time synchronization frame to the third device using the second single line, receiving, by the first device at a second time, the second time synchronization frame returned by the third device, and determining, by the first device, that the delay for transmitting the second time synchronization frame from the first device to the third device is equal to half of a difference between the second time and the first time.

Figure 7:
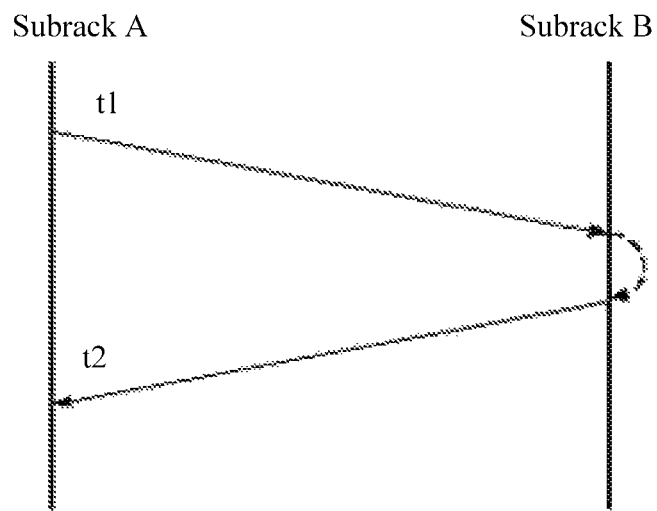
FIG. 7 is a schematic diagram of a time synchronization method according to an embodiment of this application.

Further, in this embodiment of this application, after receiving the second time synchronization frame, the first device may perform automatic delay measurement. FIG. 7 shows a schematic diagram of performing automatic delay measurement by the first device. With the automatic delay measurement of the first device, manual delay measurement is avoided such that engineering deployment is reduced.

For example, a subrack A (that is, a function module of the first device) sends the second time synchronization frame to a subrack B (that is, a function module of the third device). A local PTP timestamp t1 (that is, a first time) is added to a time for sending the second time synchronization frame. A corresponding port of the subrack B is configured with a delay measurement mode. When receiving the second time synchronization frame, the subrack B directly performs outloop on the received second time synchronization frame, and returns the second time synchronization frame to the subrack A. The subrack A adds a local PTP timestamp t2 (that is, a second time) to a time for receiving the returned second time synchronization frame.

It should be noted that when receiving the returned second time synchronization frame, the subrack A needs to determine whether the received frame is the second time synchronization frame sent by the subrack A in order to ensure that a frame sequence number is correct. This avoids an error that is caused because a delay calculation is performed on a sending time and a receiving time that are of different frames. Further, the subrack A may determine, according to a subrack number, a port number, or the like, whether the received frame is the second time synchronization frame sent by the subrack A. This is not limited in this application.

The first device may calculate a unidirectional path delay according to a first time for sending the second time synchronization frame and a second time for receiving the returned second time synchronization frame. Further, the delay is $(t_2-t_1)/2$, and the subrack A saves the delay. The first device corrects, according to the determined delay and first time information, time information based on the first time information such that a time of the first device is consistent with a time of the third device, that is, the first device keeps time synchronization with the third device.

Figure 8:
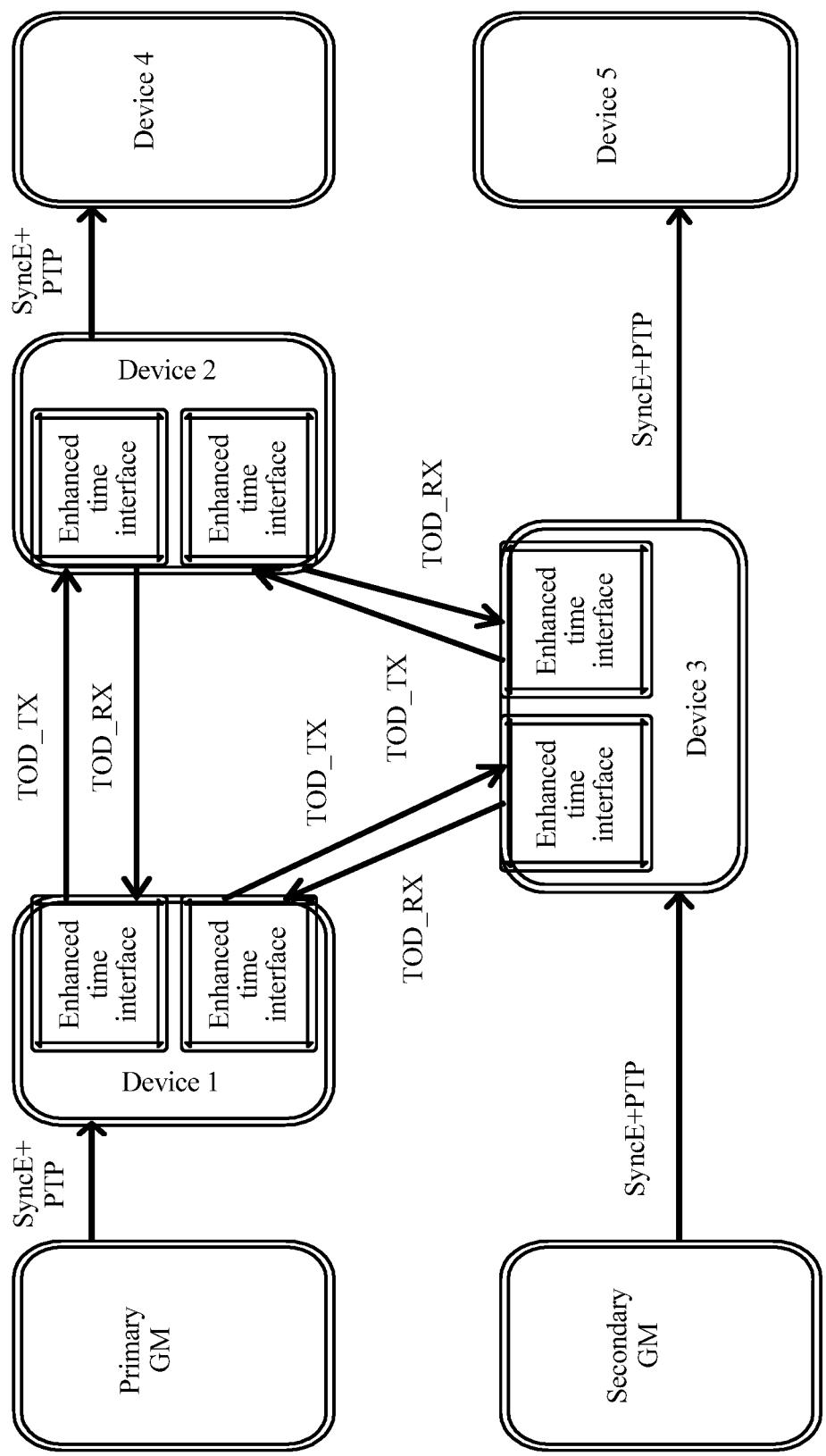
FIG. 8 is a schematic diagram of a time synchronization method according to another embodiment of this application.

For example, the time synchronization method may be applied to a ring protection scenario, as shown in FIG. 8. A device 1, a device 2, and a device 3 are co-site devices. When a GM clock (that is, a time source) is normal, the device 1 keeps time synchronization with the GM clock, and then sends a first time synchronization frame to the device 2 and device 3 using an interface such that the device 2 keeps time synchronization with the device 1, and the device 3 keeps time synchronization with the device 1. In addition, the device 3 (which may be considered as a first device) may further send a second time synchronization frame to the device 2 such that the device 2 keeps time synchronization with the device 3. That is, the device 3 can receive a time synchronization frame (for example, TOD_RX in FIG. 8) from the device 1, and can send a time synchronization frame (for example, TOD_TX in FIG. 8) to the device 2.

A second device may also automatically detect a delay between the second device and the first device, and a specific process is the same as the process in which the first device automatically detects a delay between the first device and a third device. To avoid repetition, details are not described herein again.

It should be understood that the first time synchronization frame and the second time synchronization frame may be the same, or may be different, and a first TOD and a second TOD may be the same, or may be different. This is not limited in this application.

For example, the third device sends the second time synchronization frame to the first device such that the first device synchronizes with the third device, and then the first device immediately sends the first time synchronization frame to the second device such that the second device synchronizes with the first device. Therefore, theoretically, a TOD in the first time synchronization frame and a TOD in the second time synchronization frame are the same, however, there is an error in an actual situation, and the error is generally less than 100 nanoseconds (ns).

Optionally, in this embodiment of this application, the third device and the second device may be a same device.

For example, in the ring protection scenario shown in FIG. 8, when the GM clock is faulty, a secondary clock keeps time synchronization with the device 3. In this way, the device 3 may send a time synchronization frame to the device 1 such that the device 1 keeps time synchronization with the device 3.

Based on the foregoing description, it may be learned that, in this embodiment of this application, a time synchronization frame is generated according to time information such that bidirectional transmission between devices and time synchronization between different devices may be implemented. For example, a transmission direction may be determined according to a device priority in order to fully use idle line resources, and the device priority may be determined according to a distance between a device and a time source. This is not limited in this application.

Therefore, according to the time synchronization method provided in this embodiment of this application, a first device generates, according to a first coding scheme, a first time synchronization frame including a first TOD and a first frame header, where the first frame header carries an identifier of the first coding scheme, and the first coding scheme defines a boundary of the first time synchronization frame and a location of the first TOD in the first time synchronization frame, and sends the first time synchronization frame to a second device using a single line such that the second device identifies the first time synchronization frame according to the identifier of the first coding scheme, obtains the first TOD from the first time synchronization frame, and traces a time of the first device according to the first TOD, thereby saving line resources and implementing bidirectional transmission of time information between devices.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

Figure 9A:
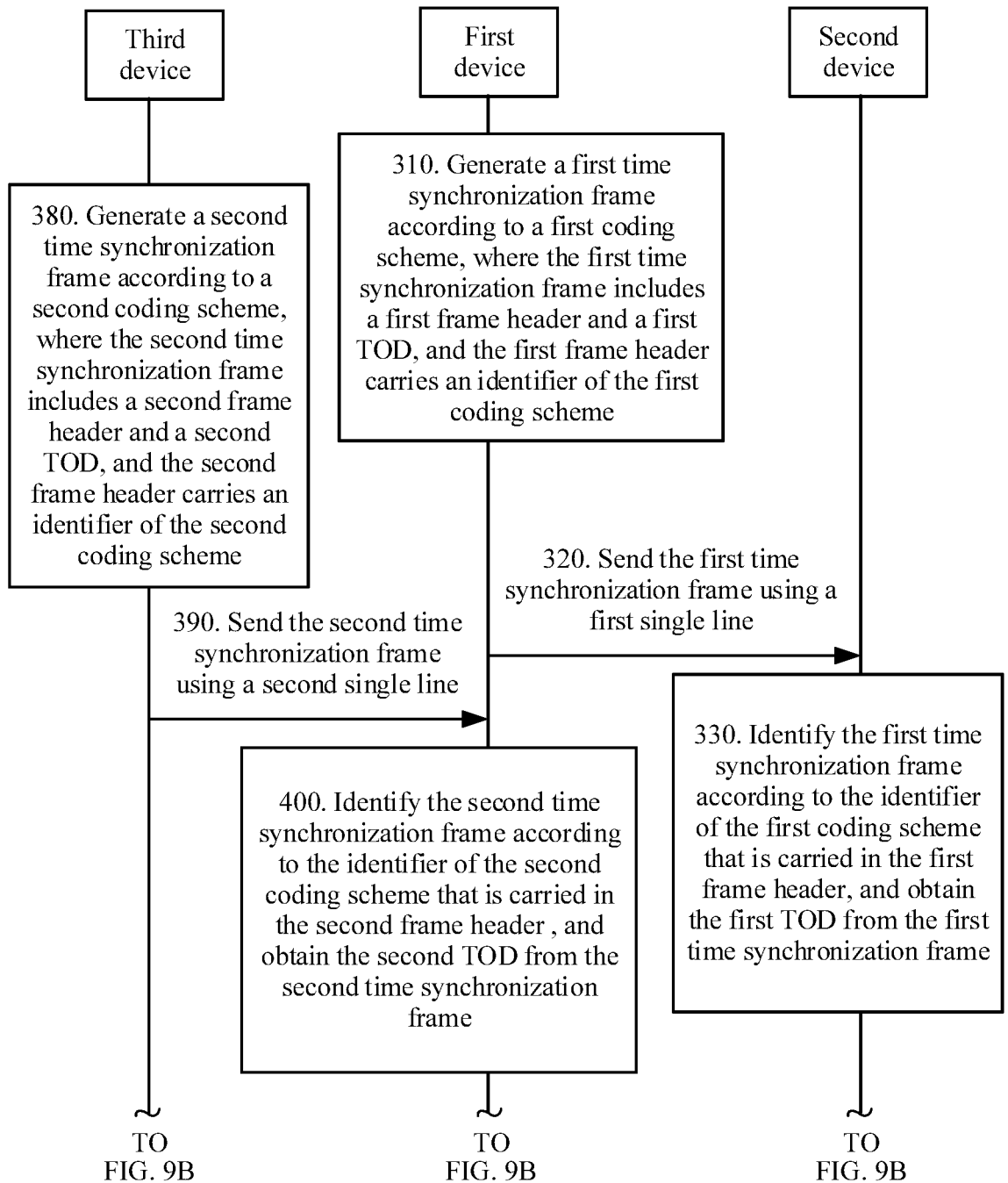
FIG. 9A and FIG. 9B are a schematic flowchart of a time synchronization method according to another embodiment of this application.
Figure 9B:
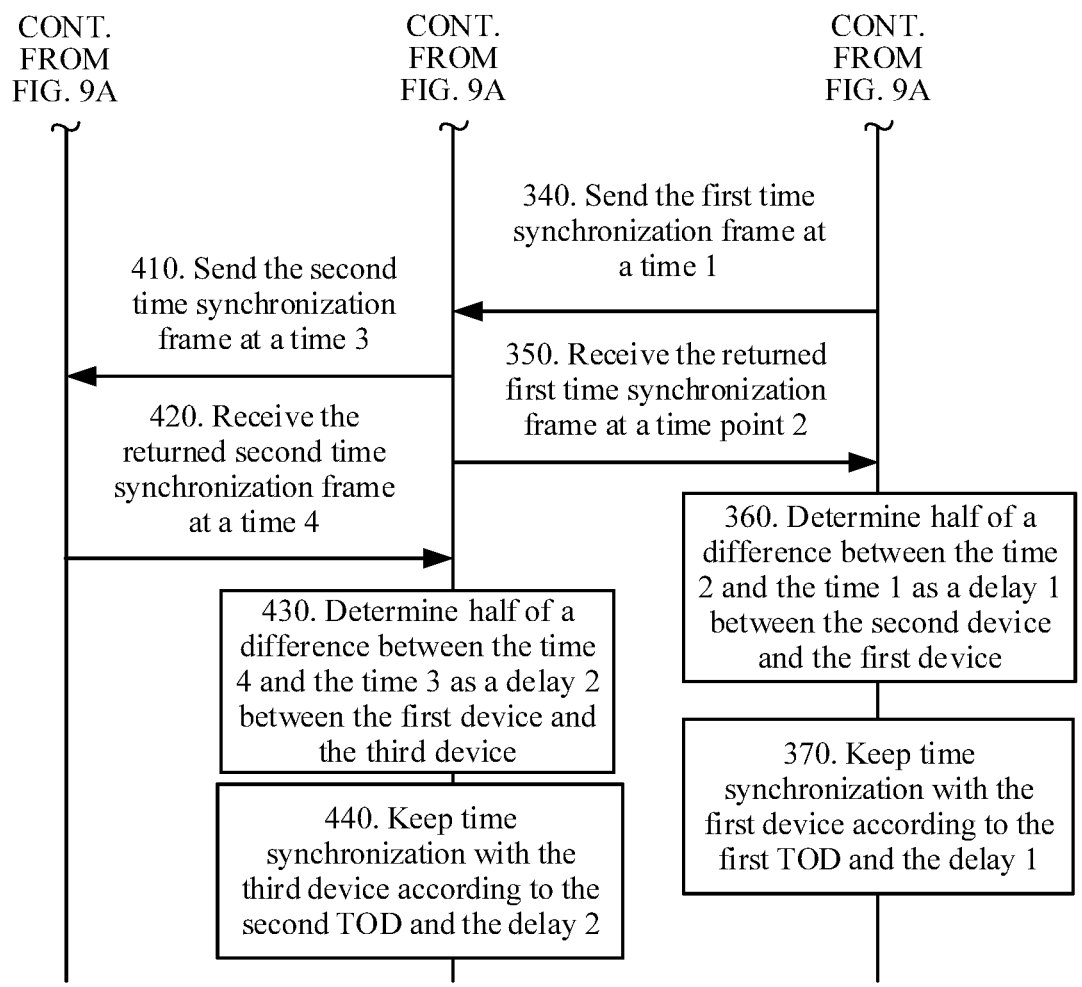

The following describes in detail an embodiment of this application with reference to FIG. 9A and FIG. 9B. It should be noted that the description is merely intended to help persons skilled in the art better understand this embodiment of this application, but are not intended to limit the scope of this embodiment of this application. Meanings of various terms in this embodiment of this application are the same as those in the foregoing embodiments.

Step 310. A first device generates a first time synchronization frame according to a first coding scheme, where the first time synchronization frame includes a first frame header and a first TOD, and the first frame header carries an identifier of the first coding scheme.

The first device may obtain a TOD from a GM clock according to a service flow and the like, or the first device is the GM clock and is configured to provide a timing service for another device such that the first device may generate the first time synchronization frame.

Step 320. The first device sends the first time synchronization frame to a second device using a single line.

Step 330. The second device identifies the first time synchronization frame according to the identifier of the first coding scheme that is carried in the first frame header, and obtains the first TOD from the first time synchronization frame.

Step 340. The second device sends the first time synchronization frame to the first device at a time 1.

After receiving the first time synchronization frame, the first device may perform automatic delay measurement. A measurement signal carries measurement information and measurement signal header information, and the measurement signal header information is used to indicate a coding scheme of the measurement signal.

Step 350. The second device receives the returned first time synchronization frame at a time 2.

Step 360. The second device determines half of a difference between the time 2 and the time 1 as a delay 1 between the second device and the first device.

Step 370. The second device keeps time synchronization with the first device according to the delay 1 and the first TOD.

Step 380. A third device generates a second time synchronization frame according to a second coding scheme, where the second time synchronization frame includes a second frame header and a second TOD, and the second frame header carries an identifier of the second coding scheme.

Step 390. The third device sends the second time synchronization frame to the first device using a single line.

Step 400. The first device identifies the second time synchronization frame according to the identifier of the second coding scheme that is carried in the second frame header, and obtains the second TOD from the second time synchronization frame.

Step 410. The first device sends the second time synchronization frame to the third device at a time 3.

Step 420. The first device receives, at a time 4, the second time synchronization frame returned by the third device.

When receiving the measurement signal, the first device needs to determine whether a received frame is a time synchronization frame sent by the first device in order to ensure that a frame sequence number is correct. This avoids an error that is caused because a delay calculation is performed on a sending time and a receiving time that are of different frames.

Step 430. The first device determines half of a difference between the time 4 and the time 3 as a delay 2 between the first device and the third device.

Step 440. The first device keeps time synchronization with the third device according to the delay 2 and the second TOD.

The first device may generate the first time synchronization frame according to the first coding scheme, and send the first time synchronization frame to the second device in order to keep time synchronization with the second device. Correspondingly, the first device may further receive the second time synchronization frame that is generated by the third device according to the second coding scheme in order to keep synchronization with the third device. That is, the first device may receive a TOD and send a TOD simultaneously such that tracing and protection of multiple devices may be implemented.

It should be understood that step 370 to step 420 and step 310 to step 360 may be performed simultaneously, that is, step 370 and step 310 may be performed simultaneously, or step 370 may be performed before step 310. This is not limited in this application.

It should be further understood that, for a specific manner of indicating the corresponding information, reference may be made to the foregoing embodiments. For brevity, details are not described herein again.

Therefore, according to the time synchronization method provided in this embodiment of this application, a first device generates, according to a first coding scheme, a first time synchronization frame including a first TOD and a first frame header, where the first frame header carries an identifier of the first coding scheme, and the first coding scheme defines a boundary of the first time synchronization frame and a location of the first TOD in the first time synchronization frame, and sends the first time synchronization frame to a second device using a single line such that the second device identifies the first time synchronization frame according to the identifier of the first coding scheme, obtains the first TOD from the first time synchronization frame, and traces a time of the first device according to the first TOD, thereby saving line resources and implementing bidirectional transmission of time information between devices.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The foregoing describes in detail the time synchronization method according to this embodiment of this application, and the following describes a first device according to an embodiment of this application.

Figure 10:
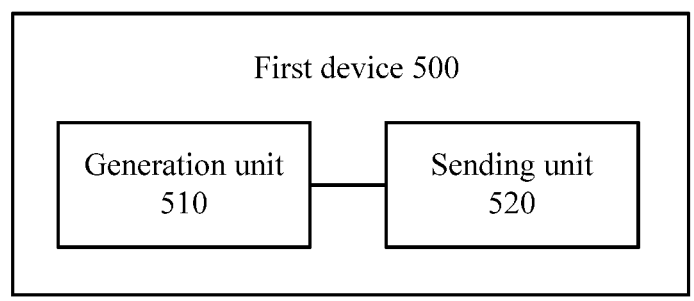
FIG. 10 is a schematic block diagram of a first device according to an embodiment of this application.

FIG. 10 shows a schematic block diagram of a first device 500 according to an embodiment of this application. The first device 500 may be configured to execute the method shown in FIG. 5. For terms related to and specific implementations of the first device 500, refer to the description of the embodiment shown in FIG. 5. As shown in FIG. 10, the first device 500 includes a generation unit 510 configured to generate a first time synchronization frame according to a first coding scheme, where the first time synchronization frame includes a first frame header and a first TOD, the first frame header carries an identifier of the first coding scheme, and the first coding scheme defines a boundary of the first time synchronization frame and a location of the first TOD in the first time synchronization frame, and a sending unit 520 configured to send the first time synchronization frame generated by the generation unit 510 to a second device using a first single line in order to trigger the second device to identify the first time synchronization frame according to the identifier of the first coding scheme, obtain the first TOD from the first time synchronization frame, and trace a time of the first device according to the first TOD.

Therefore, according to the first device 500 provided in this embodiment of this application, the first device 500 generates, according to a first coding scheme, a first time synchronization frame including a first TOD and a first frame header, where the first frame header carries an identifier of the first coding scheme, and the first coding scheme defines a boundary of the first time synchronization frame and a location of the first TOD in the first time synchronization frame, and sends the first time synchronization frame to a second device using a single line such that the second device identifies the first time synchronization frame according to the identifier of the first coding scheme, obtains the first TOD from the first time synchronization frame, and traces a time of the first device according to the first TOD in order to save line resources.

Optionally, in this embodiment of this application, the first device 500 further includes a first receiving unit (not shown) configured to receive a second time synchronization frame from a third device using a second single line, where the second time synchronization frame is generated by the third device according to a second coding scheme, the second time synchronization frame includes a second TOD and a second frame header, the second frame header carries an identifier of the second coding scheme, and the second coding scheme defines a boundary of the second time synchronization frame and a location of the second TOD in the second time synchronization frame, a first identifying unit (not shown) configured to identify the second time synchronization frame according to the identifier of the second coding scheme, and obtain the second TOD from the second time synchronization frame, and a first tracing unit (not shown) configured to trace a time of the third device according to the second TOD.

In this embodiment of this application, optionally, the first device 500 further includes a second receiving unit (not shown) configured to receive a second time synchronization frame from a third device using a second single line, where the second time synchronization frame is generated by the third device according to a second coding scheme, the second time synchronization frame includes a second TOD and a second frame header, the second frame header carries an identifier of the second coding scheme, and the second coding scheme defines a boundary of the second time synchronization frame and a location of the second TOD in the second time synchronization frame, a second identifying unit (not shown) configured to identify the second time synchronization frame according to the identifier of the second coding scheme, and obtain the second TOD from the second time synchronization frame, a determining unit (not shown) configured to determine a delay for transmitting the second time synchronization frame from the first device to the third device, a correction unit (not shown) configured to correct the second TOD according to the delay, and a second tracing unit (not shown) configured to trace a time of the third device according to the corrected second TOD.

Optionally, the determining unit is further configured to send, at a first time, the second time synchronization frame to the third device using the second single line, receive, at a second time, the second time synchronization frame returned by the third device, and determine that the delay for transmitting the second time synchronization frame from the first device to the third device is equal to half of a difference between the second time and the first time.

Optionally, in this embodiment of this application, first time information is represented in a binary-coded form.

In this embodiment of this application, optionally, the first time synchronization frame further carries a first time source identifier.

Optionally, in this embodiment of this application, the second time synchronization frame further carries second frequency information, and the second tracing unit is further configured to trace the time of the third device according to the corrected second TOD and the second frequency information.

Optionally, in this embodiment of this application, the second time synchronization frame further carries a second time source identifier.

Optionally, in this embodiment of this application, the second TOD is represented in a binary-coded form.

In this embodiment of this application, optionally, the second device and the third device are a same device.

Optionally, in this embodiment of this application, the first time synchronization frame further carries first frequency information, and the first time synchronization frame is further used to trigger the second device to trace the time of the first device according to the first frequency information.

The first device 500 in this embodiment of this application may be corresponding to a first device in a time synchronization method according to an embodiment of this application, and the foregoing and other operations and/or functions of units in the first device 500 are separately used to implement corresponding processes of the methods. For brevity, details are not described herein again.

Therefore, a first device provided in this embodiment of this application generates, according to a first coding scheme, a first time synchronization frame including a first TOD and a first frame header, where the first frame header carries an identifier of the first coding scheme, and the first coding scheme defines a boundary of the first time synchronization frame and a location of the first TOD in the first time synchronization frame, and sends the first time synchronization frame to a second device using a single line such that the second device identifies the first time synchronization frame according to the identifier of the first coding scheme, obtains the first TOD from the first time synchronization frame, and traces a time of the first device according to the first TOD, thereby saving line resources and implementing bidirectional transmission of time information between devices.

Figure 11:
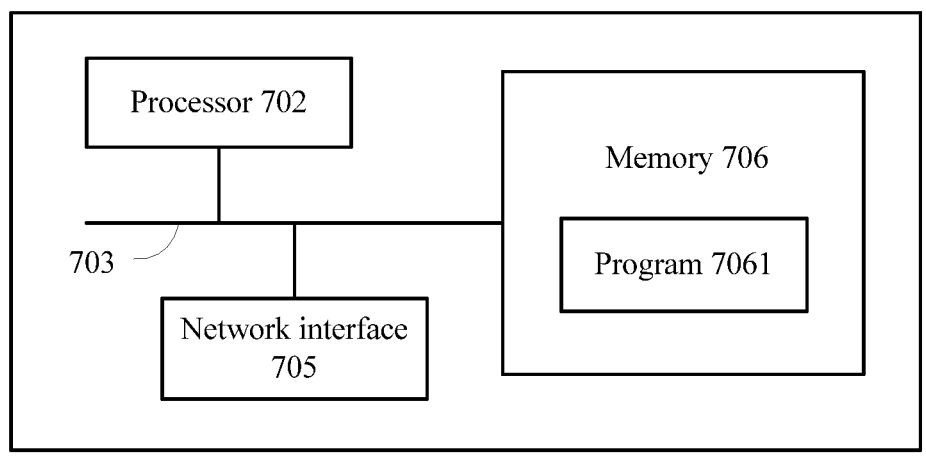
FIG. 11 is a schematic structural diagram of a first device according to an embodiment of this application.

FIG. 11 shows a structure of a first device according to an embodiment of this application. The first device shown in FIG. 11 may be configured to implement the first device 500 shown in FIG. 10. Referring to FIG. 11, the first device includes at least one processor 702 (for example, a central processing unit (CPU)), at least one network interface 705 or another communications interface, a memory 706, and at least one communications bus 703 that is configured to implement connection and communication between these apparatuses. The processor 702 is configured to execute an executable module stored in the memory 706, for example, a computer program. The memory 706 may include a high-speed random access memory (RAM), and may also include a non-volatile memory, for example, at least one magnetic disk memory. Communication connection to at least one other network element is implemented using the at least one network interface 705 (which may be wired or wireless).

In some implementations, the memory 706 stores a program 7061, and the processor 702 executes the program 7061 in order to perform the following operations of generating a first time synchronization frame according to a first coding scheme, where the first time synchronization frame includes a first frame header and a first TOD, the first frame header carries an identifier of the first coding scheme, and the first coding scheme defines a boundary of the first time synchronization frame and a location of the first TOD in the first time synchronization frame, and sending the first time synchronization frame to a second device using the network interface 705 and using a first single line in order to trigger the second device to identify the first time synchronization frame according to the identifier of the first coding scheme, obtain the first TOD from the first time synchronization frame, and trace a time of the first device according to the first TOD.

It can be learned from the foregoing technical solution provided in this embodiment of this application that a first time synchronization frame carrying a first TOD and first frame header information is generated, and the first time synchronization frame is sent to a second device using a single line such that the second device keeps time synchronization with the first device according to the first time synchronization frame in order to save line resources.

Optionally, the processor 702 is further configured to receive a second time synchronization frame from a third device using the network interface 705 and using a second single line, where the second time synchronization frame is generated by the third device according to a second coding scheme, the second time synchronization frame includes a second TOD and a second frame header, the second frame header carries an identifier of the second coding scheme, and the second coding scheme defines a boundary of the second time synchronization frame and a location of the second TOD in the second time synchronization frame, identify the second time synchronization frame according to the identifier of the second coding scheme, and obtain the second TOD from the second time synchronization frame, and trace a time of the third device according to the second TOD.

Optionally, the processor 702 is further configured to receive a second time synchronization frame from a third device using the network interface 705 and using a second single line, where the second time synchronization frame is generated by the third device according to a second coding scheme, the second time synchronization frame includes a second TOD and a second frame header, the second frame header carries an identifier of the second coding scheme, and the second coding scheme defines a boundary of the second time synchronization frame and a location of the second TOD in the second time synchronization frame, identify the second time synchronization frame according to the identifier of the second coding scheme, and obtain the second TOD from the second time synchronization frame, determine a delay for transmitting the second time synchronization frame from the first device to the third device, correct the second TOD according to the delay, and trace a time of the third device according to the corrected second TOD.

Optionally, the processor 702 is further configured to send, at a first time, the second time synchronization frame to the third device using the network interface 705 and using the second single line, receive, using the network interface 705 at a second time, the second time synchronization frame returned by the third device, and determine that the delay for transmitting the second time synchronization frame from the first device to the third device is equal to half of a difference between the second time and the first time.

Optionally, first time information carried in the first time synchronization frame is represented in a binary-coded form.

Optionally, the first time synchronization frame further carries a first time source identifier.

Optionally, the second time synchronization frame further carries second frequency information, and the processor 702 is further configured to trace the time of the third device according to the corrected second TOD and the second frequency information.

Optionally, the second device and the third device are a same device.

Optionally, the second time synchronization frame further carries a second time source identifier.

Optionally, the second TOD is represented in a binary-coded form.

Optionally, the first time synchronization frame further carries first frequency information, and the first time synchronization frame is further used to trigger the second device to trace the time of the first device according to the first frequency information.

It can be learned from the foregoing technical solution provided in this embodiment of this application that a first device generates, according to a first coding scheme, a first time synchronization frame including a first TOD and a first frame header, where the first frame header carries an identifier of the first coding scheme, and the first coding scheme defines a boundary of the first time synchronization frame and a location of the first TOD in the first time synchronization frame, and sends the first time synchronization frame to a second device using a single line such that the second device identifies the first time synchronization frame according to the identifier of the first coding scheme, obtains the first TOD from the first time synchronization frame, and traces a time of the first device according to the first TOD, thereby saving line resources and implementing bidirectional transmission of time information between devices.

An embodiment of this application further provides a computer storage medium, and the computer storage medium may store a program instruction that is used to indicate any one of methods.

Optionally, the storage medium may be a memory 706.

The term "and/or" in this specification describes only an association relationship for describing associated objects and represents that three relationships may exist. For example, A and/or B may represent the following three cases, only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

Persons of ordinary skill in the art may be aware that the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, reference may be made to a corresponding process in the foregoing method embodiments, and details are not described again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a RAM, a magnetic disk, or an optical disc.

The foregoing descriptions are merely specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A method implemented by a first device, comprising:
generating a first time synchronization frame according to a first coding scheme, wherein the first time synchronization frame comprises a first time of day (TOD) and a first identifier of the first coding scheme, and wherein the first coding scheme defines a first boundary of the first time synchronization frame and a first location of the first TOD in the first time synchronization frame; and
sending the first time synchronization frame to a second device using a first single line.

2. The method of claim 1, further comprising:
receiving a second time synchronization frame generated according to a second coding scheme from a third device using a second single line, wherein the second time synchronization frame comprises a second TOD and a second frame header, wherein the second frame header carries a second identifier of the second coding scheme, and wherein the second coding scheme defines a second boundary of the second time synchronization frame and a second location of the second TOD in the second time synchronization frame;
identifying the second time synchronization frame according to the second identifier;
obtaining the second TOD from the second time synchronization frame; and
tracing a time of the third device according to the second TOD.

3. The method of claim 2, wherein the second device and the third device are a same device.

4. The method of claim 1, further comprising:
receiving a second time synchronization frame generated according to a second coding scheme from a third device using a second single line, wherein the second time synchronization frame comprises a second TOD and a second frame header, wherein the second frame header carries a second identifier of the second coding scheme, and wherein the second coding scheme defines a second boundary of the second time synchronization frame and a second location of the second TOD in the second time synchronization frame;
identifying the second time synchronization frame according to the second identifier;
obtaining the second TOD from the second time synchronization frame;
determining a delay for transmitting the second time synchronization frame from the first device to the third device;
correcting the second TOD according to the delay; and
tracing a time of the third device according to a corrected second TOD.

5. The method of claim 4, wherein determining the delay comprises:
sending, at a first time, the second time synchronization frame to the third device using the second single line;
receiving, at a second time, the second time synchronization frame from the third device; and determining that the delay is equal to half of a difference between the second time and the first time.

6. The method of claim 4, wherein the second time synchronization frame further carries second frequency information, and wherein tracing the time of the third device comprises tracing the time of the third device according to the corrected second TOD and the second frequency information.

7. The method of claim 1, wherein the first time synchronization frame further carries first frequency information, and wherein the first time synchronization frame further triggers the second device to trace a time of the first device according to the first frequency information.

8. The method of claim 1, wherein the first time synchronization frame further carries one or more of a first time source identifier of the first device and priority information of the first device.

9. The method of claim 1, wherein the first time synchronization frame further carries one or more of a first time source identifier of the first device and a second time source identifier of the first device.

10. The method of claim 9, wherein the first time source identifier of the first device is different from the second time source identifier of the first device.

11. The method of claim 1, wherein the first identifier of the first coding scheme indicates one or more of an internal structure of the first time synchronization frame, a length of an occupied field, a specific frame header location, a frame trailer location, or content corresponding to different fields.

12. The method of claim 1, further comprising determining the first coding scheme according to a direct current (DC) level shift (DCLS) protocol.

13. The method of claim 1, wherein the first single line is implemented using a pin of an RJ45 connector.

14. A first device, comprising:
a computer-readable storage medium storing a program; and
a processor coupled to the computer-readable storage medium, wherein the program causes the processor to be configured to:
generate a first time synchronization frame according to a first coding scheme, wherein the first time synchronization frame comprises a first time of day (TOD) and a first identifier of the first coding scheme, and wherein the first coding scheme defines a boundary of the first time synchronization frame and a first location of the first TOD in the first time synchronization frame; and
send the first time synchronization frame to a second device using a first single line.

15. The first device of claim 14, wherein the program further causes the processor to be configured to:
receive a second time synchronization frame generated according to a second coding scheme from a third device using a second single line, wherein the second time synchronization frame comprises a second TOD and a second frame header, wherein the second frame header carries a second identifier of the second coding scheme, and wherein the second coding scheme defines a boundary of the second time synchronization frame and a second location of the second TOD in the second time synchronization frame;
identify the second time synchronization frame according to the second identifier of the second coding scheme;
obtain the second TOD from the second time synchronization frame; and
trace a time of the third device according to the second TOD.

16. The first device of claim 15, wherein the second device and the third device are a same device.

17. The first device of claim 14, wherein the program further causes the processor to be configured to:
receive a second time synchronization frame generated according to a second coding scheme from a third device using a second single line, wherein the second time synchronization frame comprises a second TOD and a second frame header, wherein the second frame header carries a second identifier of the second coding scheme, and wherein the second coding scheme defines a boundary of the second time synchronization frame and a second location of the second TOD in the second time synchronization frame;
identify the second time synchronization frame according to the second identifier;
obtain the second TOD from the second time synchronization frame;
determine a delay for transmitting the second time synchronization frame from the first device to the third device;
correct the second TOD according to the delay; and
trace a time of the third device according to a corrected second TOD.

18. The first device of claim 17, wherein the program further causes the processor to be configured to:
send, at a first time, the second time synchronization frame to the third device using the second single line;
receive, at a second time, the second time synchronization frame from the third device; and
determine that the delay for transmitting the second time synchronization frame from the first device to the third device is equal to half of a difference between the second time and the first time.

19. The first device of claim 17, wherein the second time synchronization frame further carries second frequency information, and wherein the program further causes the processor to be configured to trace the time of the third device according to the corrected second TOD and the second frequency information.

20. The first device of claim 14, wherein the first time synchronization frame further carries first frequency information, and wherein the first time synchronization frame further triggers the second device to trace time of the first device according to the first frequency information.

21. A computer program product comprising instructions for storage on a non-transitory computer-readable storage medium that, when executed by a processor, causes a computer to:
generate a first time synchronization frame according to a first coding scheme, wherein the first time synchronization frame comprises a first time of day (TOD) and a first identifier of the first coding scheme, and wherein the first coding scheme defines a boundary of the first time synchronization frame and a first location of the first TOD in the first time synchronization frame; and
send the first time synchronization frame to a second device using a first single line.

22. The computer program product of claim 21, wherein the instructions further cause the computer to:
receive a second time synchronization frame generated according to a second coding scheme from a third device using a second single line, wherein the second time synchronization frame comprises a second TOD and a second frame header, wherein the second frame header carries a second identifier of the second coding scheme, and wherein the second coding scheme defines a boundary of the second time synchronization frame and a second location of the second TOD in the second time synchronization frame;
identify the second time synchronization frame according to the second identifier;
obtain the second TOD from the second time synchronization frame; and
trace a time of the third device according to the second TOD.

23. The computer program product of claim 21, wherein the instructions further cause the computer to:
receive a second time synchronization frame generated according to a second coding scheme from a third device using a second single line, wherein the second time synchronization frame comprises a second TOD and a second frame header, wherein the second frame header carries a second identifier of the second coding scheme, and wherein the second coding scheme defines a boundary of the second time synchronization frame and a second location of the second TOD in the second time synchronization frame;
identify the second time synchronization frame according to the second identifier;
obtain the second TOD from the second time synchronization frame;
determine a delay for transmitting the second time synchronization frame from a first device to the third device;
correct the second TOD according to the delay; and
trace a time of the third device according to a corrected second TOD.

24. The computer program product of claim 23, wherein the instructions further cause the computer to:
send, at a first time, the second time synchronization frame to the third device using the second single line;
receive, at a second time, the second time synchronization frame from the third device; and
determine that the delay for transmitting the second time synchronization frame from the first device to the third device is equal to half of a difference between the second time and the first time.

25. The computer program product of claim 23, wherein the second time synchronization frame further carries second frequency information, and wherein the instructions further cause the computer to trace the time of the third device according to the corrected second TOD and the second frequency information.

26. A method, comprising:
receiving a first time synchronization frame, wherein the first time synchronization frame comprises a first time of day (TOD) and an identifier of a first coding scheme, and wherein the first coding scheme defines a boundary of the first time synchronization frame and a location of the first TOD in the first time synchronization frame;
identifying the first time synchronization frame according to the identifier;
obtaining the first TOD from the first time synchronization frame; and
tracing a time according to the first TOD.

27. The method of claim 26, wherein the first time synchronization frame further comprises a frame header, and wherein the frame header comprises the identifier.

28. The method of claim 27, wherein the method is implemented by a device, and wherein the device is one of a wavelength division device, a satellite positioning system receiver, a core network device, an aggregation network device, a base station, a base station controller, a server, an optical transport network device, a packet transport network device, or a switch.

29. The method of claim 26, wherein receiving the first time synchronization frame comprises receiving the first time synchronization frame through a first single line.

30. A system, comprising:
a second device; and
a first device configured to:
generate a first time synchronization frame according to a first coding scheme, wherein the first time synchronization frame comprises a first time of day (TOD) and an identifier of the first coding scheme, and wherein the first coding scheme defines a boundary of the first time synchronization frame and a location of the first TOD in the first time synchronization frame; and
send the first time synchronization frame to the second device using a first single line.

31. The system of claim 30, wherein the second device is configured to:
receive the first time synchronization frame through the first single line;
identify the first time synchronization frame according to the identifier of the first coding scheme;
obtain the first TOD from the first time synchronization frame; and
trace a time of the first device according to the first TOD.

* * * * *